(12) United States Patent
Hollander et al.

(10) Patent No.: US 6,445,880 B1
(45) Date of Patent: Sep. 3, 2002

(54) WATER HEATING SYSTEM WITH AUTOMATIC TEMPERATURE CONTROL

(75) Inventors: Philip S. Hollander, Bronx; Gerald A. Fioriti, Rock Tavern, both of NY (US)

(73) Assignee: Aerco International, Inc., Northvale, NJ (US)

( * ) Notice: Subject to any disclaimer, the term of this patent is extended or adjusted under 35 U.S.C. 154(b) by 0 days.

(21) Appl. No.: 09/872,784

(22) Filed: Jun. 1, 2001

(51) Int. Cl.[7] .............................. F24H 1/10; H05B 3/78
(52) U.S. Cl. ...................................... 392/485; 122/14.1
(58) Field of Search ................................ 392/465, 466, 392/474, 485, 498; 122/13.07, 14.1

(56) References Cited

U.S. PATENT DOCUMENTS

| | | | |
|---|---|---|---|
| 4,305,547 A | | 12/1981 | Cohen |
| 4,519,422 A | | 5/1985 | Cohen |
| 4,574,746 A | | 3/1986 | Keyes, IV et al. |
| 4,786,782 A | | 11/1988 | Takai et al. |
| 4,852,524 A | | 8/1989 | Cohen |
| 5,020,127 A | | 5/1991 | Eddas et al. |
| 5,058,804 A | | 10/1991 | Yonekubo et al. |
| 5,347,956 A | | 9/1994 | Hughes |
| 5,459,890 A | * | 10/1995 | Jarocki ....................... 122/13.3 |
| 5,881,681 A | | 3/1999 | Stuart |
| 6,024,290 A | * | 2/2000 | Dosani et al. ............... 165/132 |
| 6,351,603 B2 | * | 2/2002 | Waithe et al. ............... 392/465 |

OTHER PUBLICATIONS

Inline/Circulation Water Heater brochure. Infinity Fluids Corporation, at least as early as May 24, 2000, Norwich, CT.

AERCO Hot Water Systems Brochure, Aerco International, Inc. Nov., 1996, Northvale, NJ.

G. Sites, "Understanding SCR Power Controls," HDR Power Systems Application Note, HDR Power Systems, Inc., 1999, Columbus, OH.

Hubbel Water Heaters, Instantaneous Circulation Heater Specification, www.hubbelheaters.com, at least as early as May 24, 2000, Stratford, CT.

Chromalox Water Boiler Specifications, www. chromalox. com, at least as early as May 24, 2000, Ogden, UT.

Seisco Electric Tankless Water Heaters, www.global-towne.com, at least as early as May 24, 2000.

Ariston Electric Water Heaters, www.globaltowne.com, at least as early as May 24, 2000.

* cited by examiner

Primary Examiner—Teresa Walberg
Assistant Examiner—Thor Campbell
(74) Attorney, Agent, or Firm—Baker Botts L.L.P.

(57) ABSTRACT

A water heating system having an electric heater and an automatic temperature control system having high dynamic response for supplying water on demand at a substantially constant, controlled temperature is provided. The device includes a heat exchanger, and inlet diverting pipe, an outlet diverting pipe, a mixed flow pipe and a temperature control system. A tuning valve on each of the inlet flow diverting pipe and the outlet flow diverting pipe controls the ratio of heated and unheated flow entering the mixed flow pipe. The temperature control system controls the temperature of the water by establishing an empirical, monotonic relationship between the current applied to the heater and the temperature of the mixed flow.

17 Claims, 5 Drawing Sheets

WATER HEATING SYSTEM WITH AUTOMATIC TEMPERATURE CONTROL

BACKGROUND OF THE INVENTION

1. Field of the Invention

The invention relates to a water heating system, and more particularly to an electric water heating system having a control system for controlling the amount of heat transfer between the electric heat element and the water by modulating the current to the heating element to supply potable water at a substantially constant, controlled temperature.

2. Background of the Related Art

Hot water temperature control devices have conventionally included heat exchangers to accomplish heat transfer between water which rapidly flows within tubes and a heat source, either steam or gas, exposed to the outside of the tubes. Other hot water temperature control devices have used electric heating elements to heat the water. Often a thermostat is employed to establish a temperature set point and to control the heating of the water in such a manner as to maintain the temperature of the water as delivered by the system at this set point.

These systems, generally termed "instantaneous", do not operate entirely satisfactorily in a water heating system which may have fluctuating flow and input energy. For potable water heaters, the demand fluctuates greatly over a period of time. Demand on the system may remain low for a long period of time, and increase to a higher level at certain times of the day, e.g., in the mornings. As heated (hot) water is withdrawn from the tank, and replaced by unheated (cold) water, the temperature sensor initially detects the desired temperature and suddenly, as the unheated water reaches the sensor, detects a temperature that may be significantly below the set point temperature. The thermostat then calls for more heat to be supplied to the water, but by that time much of the storage tank is filled with unheated water.

This problem is not solved by placing the temperature sensor near the incoming water. Such placement does not permit precise control of the temperature of the water near the outlet of the tank as the water is to be delivered to the appliances or other users of hot water. Moreover, regardless of the location of the sensor in prior art systems of this type, there is an abrupt change in the temperature of the water at the sensor, as the water is withdrawn from the storage tank. Since the system has no way of anticipating this abrupt change, it fails to call for heat as early as it should, and, when a call for heat is made, the system must run at maximum capacity for an extended period in order to catch up with the demand. As a result of such poor temperature control, storage tanks are usually employed for use with an instantaneous system to store heated water at a fixed temperature; in one embodiment water is pumped at a constant rate through the system to keep the temperature constant. Other methods include heating the stored water without pumping means and relying on natural convection to accomplish temperature control.

This problem was previously addressed in commonly-assigned U.S. Pat. No. 4,305,547 (the "'547 patent"). While the water heating system disclosed in the '547 patent was a substantial improvement over the prior art, the present invention seeks to go even further and provides an electric water heating system that provides substantially constant temperature control with reduced complexity and cost to manufacture the system.

SUMMARY OF THE INVENTION

An object of the present invention is to provide an electric water heating system which is not subject to significant drops in temperature during periods of increased demand and that provides outlet water at a substantially constant temperature.

Another object of the present invention is to provide an electric water heater which does not require complicated apparatus.

A further object of the present invention is to provide an empirical relationship between the temperature of a mixed flow of inlet water and outlet water and the current applied to the heating element to maintain the setpoint temperature.

These objectives and characteristics are achieved, in accordance with the present invention, by providing a novel combination of several components, including a heat exchanger tank, an inlet flow diverting pipe, an outlet flow diverting pipe, a mixed flow diverting pipe, and a temperature control system.

The heat exchanger tank has an inlet for receiving an inlet flow of liquid into the tank, an outlet for allowing an outlet flow of liquid to leave the tank. The heating element is positioned in the heat exchanger tank and is configured to heat the liquid passing through the water tank from the inlet to the outlet.

The inlet flow diverting pipe carries a portion of the inlet flow diverted from flowing into the tank, and the outlet flow diverting pipe carrying a portion of the outlet flow diverted from the outlet. The mixed flow pipe is configured to carry a flow of liquid partially received from the inlet flow diverting pipe and partially received from the outlet flow diverting pipe. A first tuning valve on the inlet flow diverting pipe is provided to control flow in the inlet diverting pipe. A second tuning valve on the outlet flow diverting pipe is provided to control flow in the outlet diverting pipe.

The temperature control system comprises a temperature sensor configured to determine the temperature of the mixed flow in the mixed flow pipe. The temperature control system modulates the current to the heating element in response to the temperature of the mixed flow based on a predetermined empirical relationship between the current applied to the heating element and the temperature of the mixed flow.

The empirical relationship between the current applied to the heating element and the temperature of the mixed flow has a first data point and a second data point, and may have several intermediate, empirically determined data points. The first data point is defined by the condition wherein the first and second tuning valves are tuned such that the temperature of the mixed flow is a predetermined temperature above the temperature of the inlet flow when the heating element is at substantially maximum current. A second data point is defined by the condition wherein the first and second tuning valves are tuned such that the temperature of the mixed flow is a predetermined temperature below the setpoint temperature when the heating element is at substantially minimum current.

These and other features, aspects, and advantages of the present invention will become better understood with regard to the following detailed description, appended claims, and accompanying drawings.

DETAILED DESCRIPTION OF THE EXEMPLARY EMBODIMENTS

Figure 1:
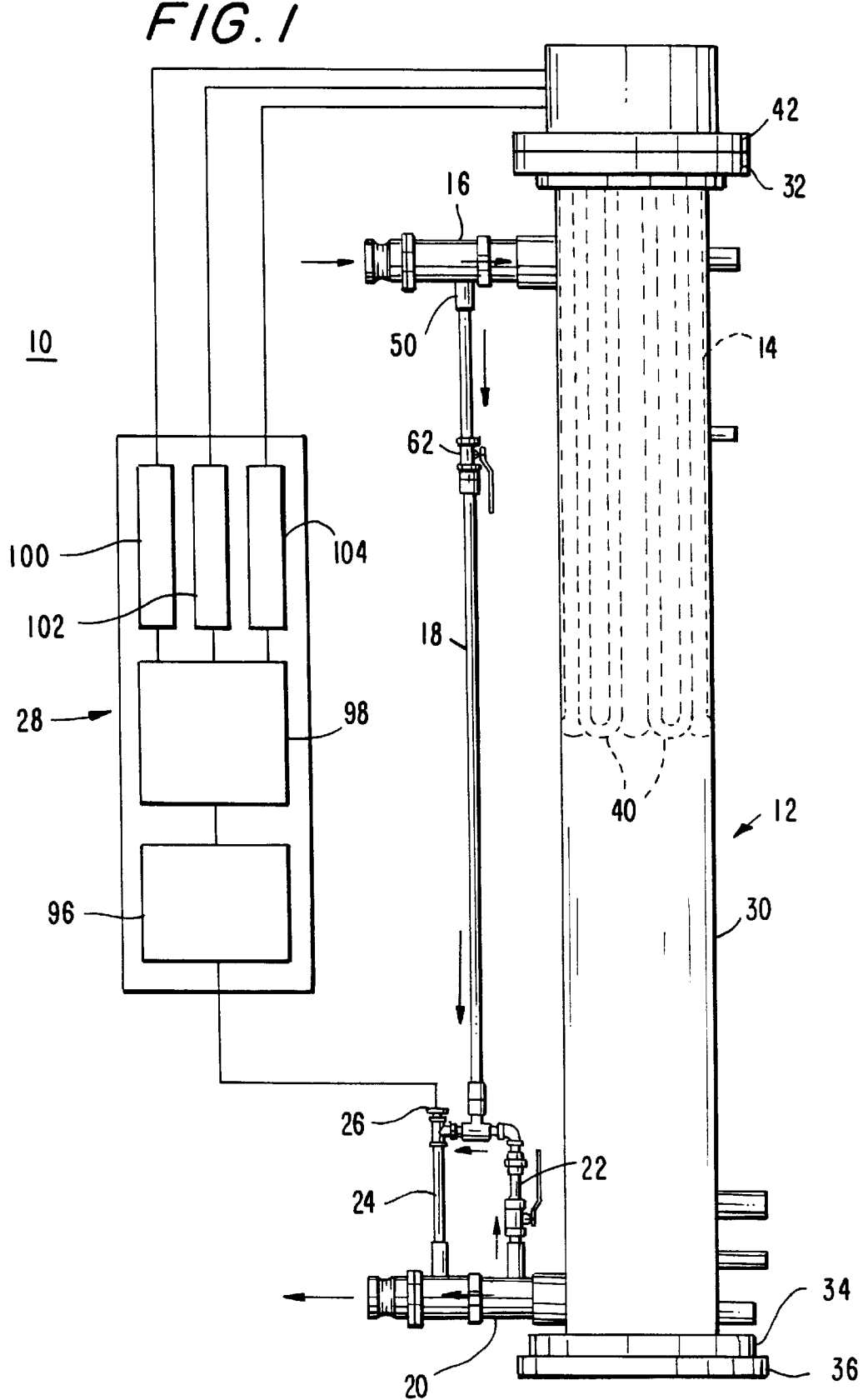
FIG. 1 is an elevational view of a water heating system in accordance with the invention.

As shown in the drawings, and in particular to FIG. 1, an exemplary embodiment of the water heating system 10 in accordance with the invention includes a heat exchanger tank 12, a heater 14, an inlet flow pipe 16, an inlet flow diverting pipe 18, an outlet flow pipe 20, and outlet flow diverting pipe 22, a mixed flow pipe 24, a water temperature sensor 26, and a temperature control system 28.

The heat exchanger tank 12 is configured to receive unheated water from the inlet flow pipe 16, to contain the water which is heated as it flows around heating elements of the heater 14, and to direct the heated water to the outlet flow pipe 20 to be used for hot water faucets, showers, washing machines, etc. Water flow rates through the water heating system 10 depend, in part, on the demands by the users as described above, and thus may vary during operation. Consequently, water flow rates may be in the range of about 0 gpm to about 10 gpm for the exemplary embodiment, and about 60 gpm for larger capacity water heating systems in accordance with the invention. As will be described in greater detail herein, the control system of the water heating system 10 maintains a setpoint temperature, which is typically about 130° F., and which may be as high as about 210° F. The water heating system 10 may deliver an output of approximately 425,000 BTU/hour (125 kW). It is noted that the above capacities and dimensions are exemplary, and the water heating system as described herein may be modified in order to meet the demands of other systems. For example, an output of about 3,500,000 BTU/hour (1 MW) may be produced by a larger capacity water heating system configured in accordance with the principles of the invention.

The heat exchanger tank 12 may be constructed from an upright, substantially cylindrical shell 30, having an upper circular flange 32 and a lower circular flange 34. The inlet flow pipe 16 is located towards the top of the shell 30 and communicates with the interior of the shell 30. Water flows downward through the heat exchanger tank 12 to the outlet flow pipe 20, which is located towards the bottom of the shell 30, and which also communicates with the interior of the shell 30. The shell 30 may be manufactured from ANSI SA-53 grade B carbon steel pipe. Alternative materials may be used, such as, for example, carbon steel with a polyimide coating, or a copper-nickel alloy, such as C 70600, or a glass fiber material, such as vinylester resin. In accordance with an exemplary embodiment, the heat exchanger tank 12 may have a diameter of about 10 inches, and a height of about 60 inches. The thickness of the shell 30 may be about ¼ inch. The upper flange 32 and lower flange 34 are also manufactured from ANSI SA-516 grade 70 carbon steel. The lower flange 34 may be bolted to a bottom portion 36, which may be a 16" diameter, 1 inch thick carbon steel plate having a flat or concave configuration. The inlet flow pipe 16 and the outlet flow pipe 20, may each be 2 inch diameter pipes, manufactured from standard carbon steel pipe and attached to the shell by welding. It is noted that other materials, such as copper-nickel, bronze, titanium or stainless steel may be also useful to manufacture the water tank components.

Figure 2:
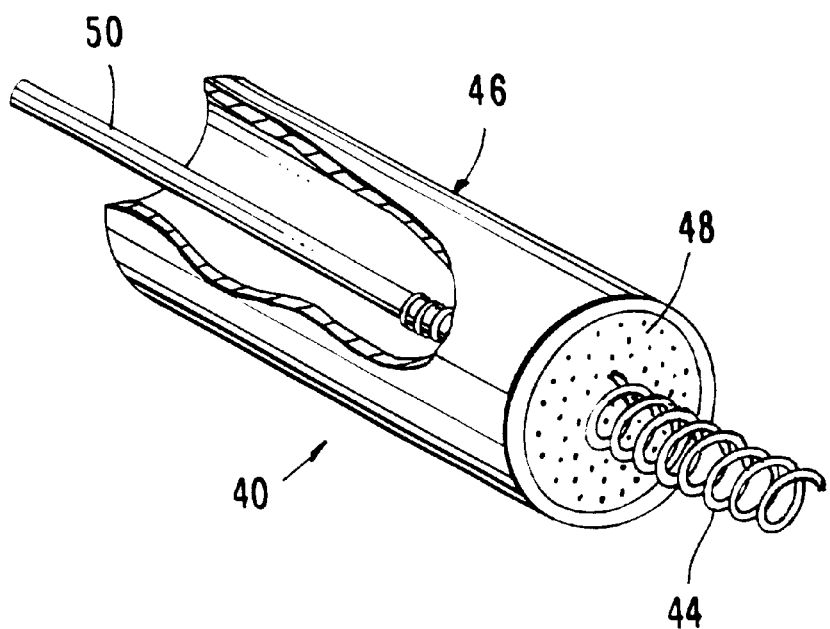
FIG. 2 is a perspective view in partial section illustrating a portion of the water heating system in accordance with the invention.

The heater 14 is positioned within the shell 30 and heats the water as it flows around the heating elements through the heat exchanger tank 12. The heater 14 in the exemplary embodiment may be an immersion heater, such as the Chromalox® immersion heater manufactured by the Wiegand Industrial Division of Emerson Electric Co., of Ogden, Utah., which is rated at 440V and 125 kW. The heater 14 includes a plurality of hairpin bent tubular heating elements 40 welded or brazed to a flange 42. This flange 42 is typically bolted to the top flange 32 of the heat exchanger tank 12, such that the heating elements 40 are positioned within the interior of the heat exchanger tank 12 and immersed in the water when the heat exchanger tank 12 is filled. As illustrated in FIG. 2, the heating elements 40 may each comprise a coiled resistor wire 44, manufactured from a material that provides the desired heating characteristics, such as nickel-chromium. The resistor wire 44 is surrounded by an outer metal sheath 46, e.g., copper, and surrounded by material 48, such as compacted magnesium oxide, between the resistor wire 44 and the metal sheath 46. Material 48 electrically insulates resistor wire 44 and conducts the heat produced by the resistor wire 44 to the metal sheath 46, thereby heating the water in the heat exchanger tank 12. Each resistor wire 44 is connected to a respective terminal pin 50 (only one of which is shown in FIG. 2), which are wired, e.g., by brazing, to circuits controlled by the control system 28 (not shown in FIG. 2). In the exemplary embodiment, the heater 14 includes 27 heating elements 40 which are controlled by three circuits, as described below.

Figure 3:
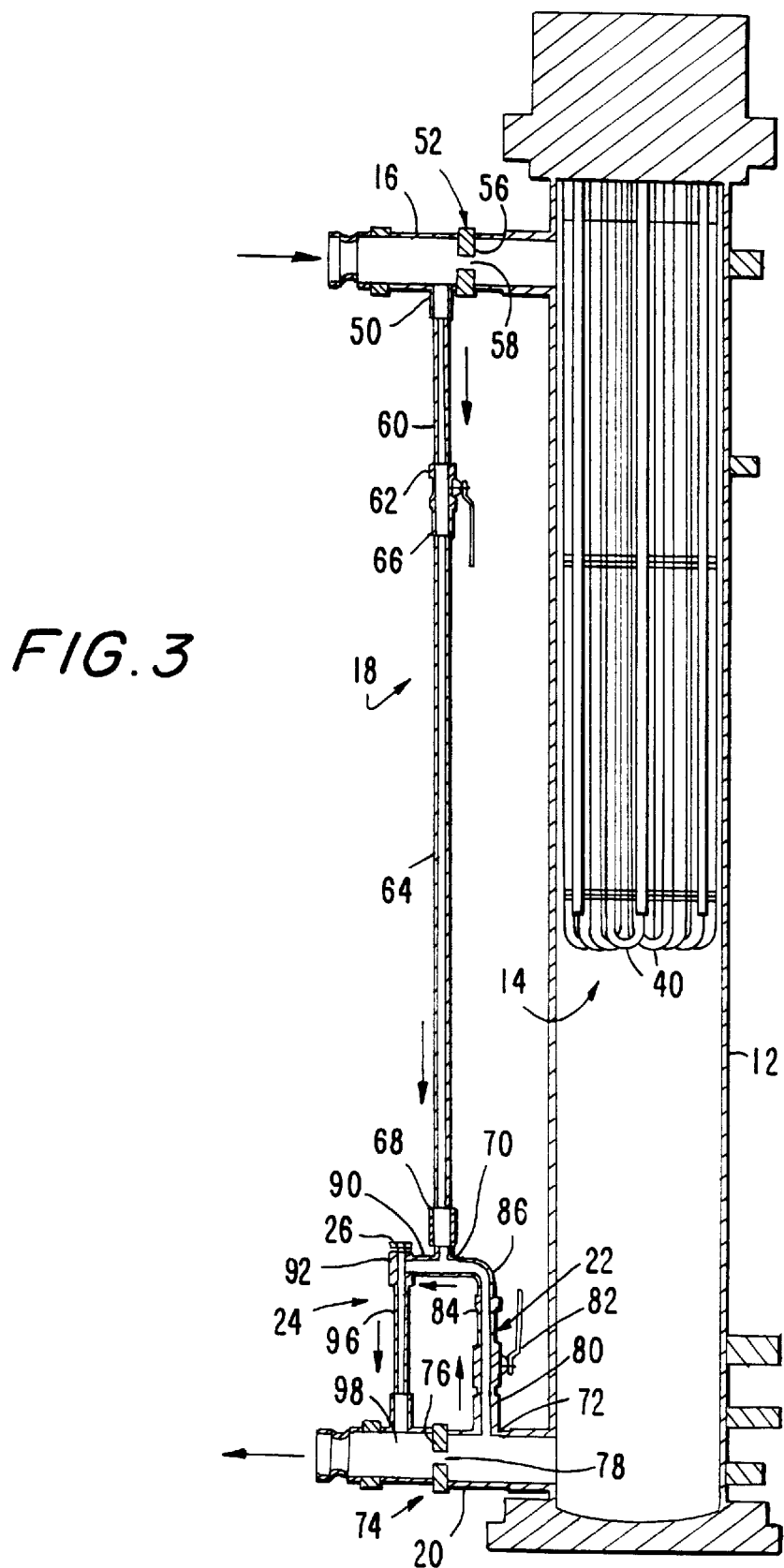
FIG. 3 is a sectional view of the water heating system illustrated in FIG. 1 in accordance with the invention.

As illustrated in FIG. 3, water is introduced by the inlet flow pipe 16 into the heat exchanger tank 12 at the upper portion thereof. A portion of the flow in the inlet flow pipe 16 is diverted into an inlet diverting pipe 18, which may include several components. The inlet flow diverting pipe 18 may be connected to the inlet flow pipe 16 by a 2"×¼" carbon steel weldolet 50. An orifice disk 52 or similar structure may be positioned inside the inlet flow pipe 16, slightly downstream from the inlet diverting pipe 18 to divert a portion of the inlet flow to the inlet diverting pipe 18. The orifice disk is a plate 56 that is positioned in the inlet water flow and has a small orifice 58, or aperture extending through the plate 56. A portion of the water in the inlet flow pipe 16 passes through the orifice 58 and into the heat exchanger tank 12, and another portion hits the plate 56 and is diverted into the diverting pipe 18. As determined empirically, the orifice 58 may have a diameter of about ⅜ inch. The plate 56 may comprise a ⅛ inch thick copper plate.

The portion of the inlet flow that has been diverted by the orifice disk 52 passes through the weldolet 50 and into the inlet diverting pipe 18. A first portion of the inlet diverting pipe may be a carbon steel pipe 60 having a ¼ inner diameter. The water flow through the inlet diverting pipe 18 may be throttled by a tuning valve 62, such as a ball valve, although other valves may be used. The tuning valve 62 is adjustable to control the flow of unheated inlet water, as will be described below with respect to initially tuning the water heating system 10. The tuning valve 62 may be connected to the next portion of the inlet diverting pipe, a copper tube 64, by a ¼" NPT compression fitting 66. The water flow continues through the copper tube 64, to a second compression fitting 68, and to a tee connector 70, which may be manufactured from carbon steel.

The heated water flows out of the heat exchanger tank 12 through the outlet flow pipe 20. The outlet flow diverting pipe 22 is connected to the outlet flow pipe 20 by use of a 2"×¼" carbon steel weldolet 72. As described above with respect to the inlet flow pipe 16, a second orifice disk 74 is positioned inside the outlet pipe 20 slightly downstream from the outlet diverting pipe 22. A portion of the heated outlet water flow continues out of the water heating system 10, and a portion of the heated outlet flow is diverted by the second orifice disk 74 to the outlet diverting pipe 22. According to the exemplary embodiment, the orifice disk 74 is a ⅛ inch copper plate 76 having an orifice 78 of ⅜ inch diameter.

The portion of the outlet flow that is diverted by the second orifice disk 74 passes through the weldolet 72 into the outlet diverting pipe 22. A first portion of the outlet diverting pipe 22 may be a ¼ carbon steel pipe section 80, which is connected to a second tuning valve 82, such as a ball valve or other type of valve, to control the diverted outlet flow. In the exemplary embodiment, the diverted outlet flow passes into a ¼" diameter union section 84, to a ¼" carbon steel elbow 86, and then to the tee connector 70, where the heated diverted outlet flow is mixed with the unheated diverted inlet flow, from the inlet flow diverting pipe 18, producing the mixed flow, as will be described in greater detail herein.

The mixed flow passes through the mixed flow pipe 24, which may include a ¼" close nipple 90 connected to a second tee connector 92. The mixed flow contacts the temperature sensor 26 positioned adjacent the tee connector 92, where the temperature of the mixed flow is obtained, as will be described in greater detail below. The mixed flow passes through another portion 96 of the mixed flow pipe 24, which may be a ¼" carbon steel pipe, and continues through another weldolet 98 which communicates with the outlet flow pipe 20. The mixed flow then combines with the outlet flow. As will be described in greater detail herein, the first tuning valve 62 and the second tuning valve 82 may be adjusted to control the relative proportions of inlet flow and outlet flow which comprise the mixed flow in mixed flow pipe 24. The component parts of the inlet diverting pipe 18, of the outlet diverting pipe 22, and of the mixed flow pipe 24 described herein are exemplary, and it is noted that this configuration could be substituted with different components or with tubing.

The water heating system in accordance with the invention maintains the temperature of the outlet flow by adding heat to the water in the heat exchanger tank 12. As described above, the flow rate into the heat exchanger tank 12 may vary depending on the demand. For example, for potable water heating systems, the demand for hot water may peak during the morning hours, in which the flow rate will be high. At other times of the day, demand will be lower, and the flow rate will also be lower. Also, the temperature of the inlet flow may vary with the source of the inlet flow. The amount of energy Q. that must be added to the water to achieve the setpoint temperature is described by the equation:

$$Q = \dot{m} c \Delta T \tag{1}$$

where, ṁ represents the mass flow rate of the water, c is the heat capacity of the water, and ΔT is the difference between the inlet flow temperature and the outlet flow temperature. For an incompressible fluid such as water, the heat capacity c is constant. Consequently, the amount of heat added to the water to increase the temperature of the outlet flow to the setpoint temperature is a function of the mass flow rate and the difference between the inlet flow temperature and the outlet flow temperature:

$$Q = f(\dot{m}, \Delta T) \tag{2}$$

The water heating system in accordance with the invention controls the temperature of the outlet flow by establishing an empirical relationship between the temperature of the mixed flow and the amount of current added to the electric heater. Measuring the temperature of the mixed flow provides an indication of both the inlet mass flow rate and the temperature of the inlet flow, without the need to individually measure each quantity.

Figure 4:
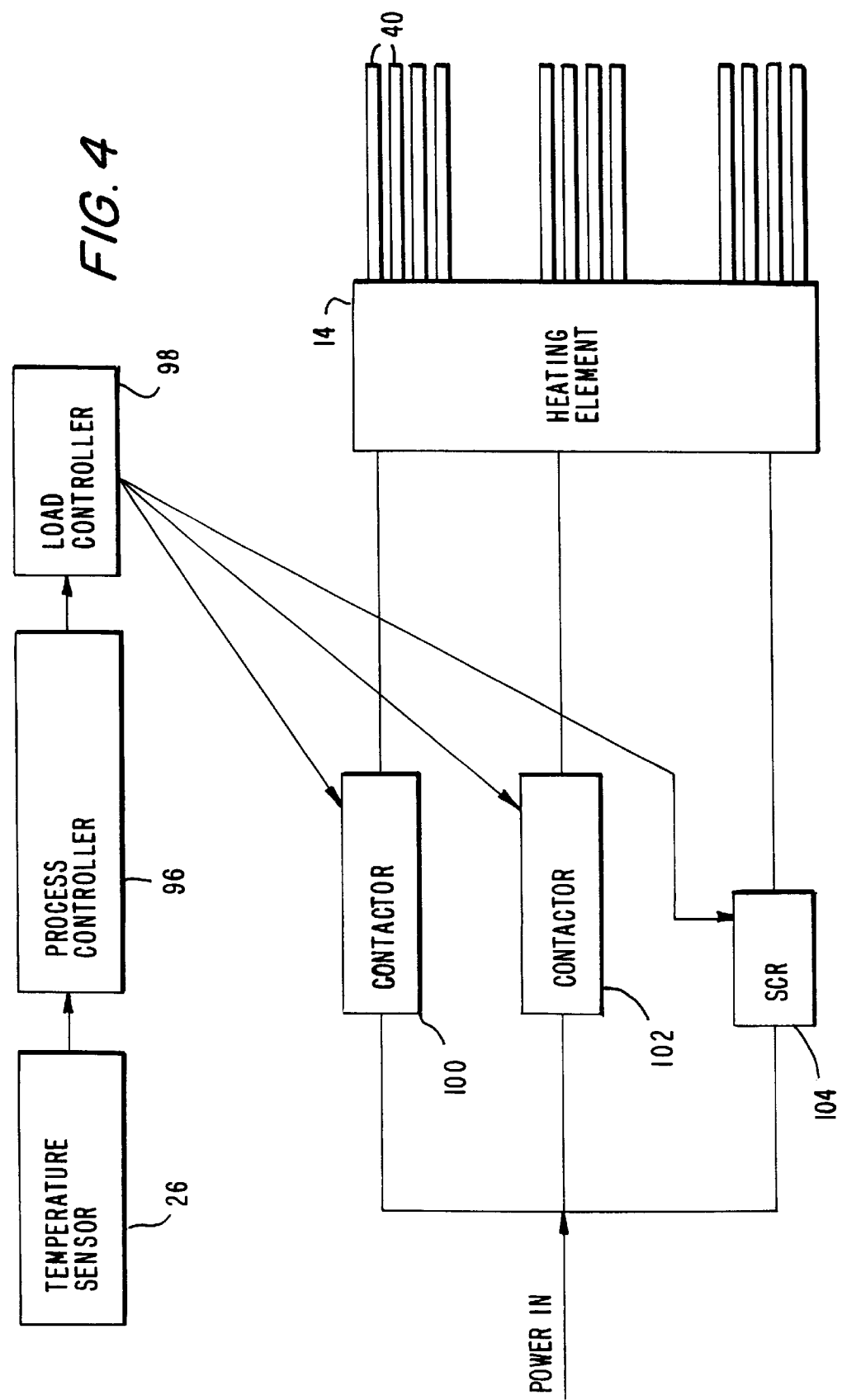
FIG. 4 is a simplified block diagram of the temperature control system of the water heating system in accordance with the invention.

With reference to FIG. 4, the temperature of the mixed flow is detected by the temperature sensor 26. The temperature sensor 26 is preferably a Balco wire, such as a Balco wire manufactured by Minco Products, Inc., of Minneapolis, Minn. As is known in the art, the Balco wire is a resistive element whose resistance changes with temperature. In the exemplary embodiment, the resistance of the Balco wire is calculated based on the temperature by the following equation:

$$R = (0.00161)*T^2 + (1.961)*T + 854.841 \tag{1}$$

where T (temperature) is measured in degrees Fahrenheit, and R (resistance) is in ohms. A voltage is applied across the wire, and the voltage drop is used to calculate the temperature. Alternatively, the temperature of the mixed flow may be measured by other temperature sensors known in the art, such as thermocouples, resistance temperature detectors (RTDs), thermistors, and the like.

The process controller 96 applies a voltage across the Balco wire and calculates the temperature of the mixed flow as an input from the temperature sensor 26 and produces, as an output, the "fire rate" at which the heater should operate to heat the water to the desired setpoint temperature. In the exemplary embodiment, the process controller 96 is the LOVE 1600 Series Temperature/Process controller, manufactured by Love Controls, Michigan City, Id. The fire rate is percentage of fall current. For the exemplary heater, a 100% fire rate corresponds to 20 mA and 0% fire rate corresponds to 4 mA. The process controller uses a table look-up function, which refers to a table having mixed flow temperature as an input parameter and fire rate as an output parameter for a discrete number of data points, and a data interpolation routine as is known in the art.

Figure 5:
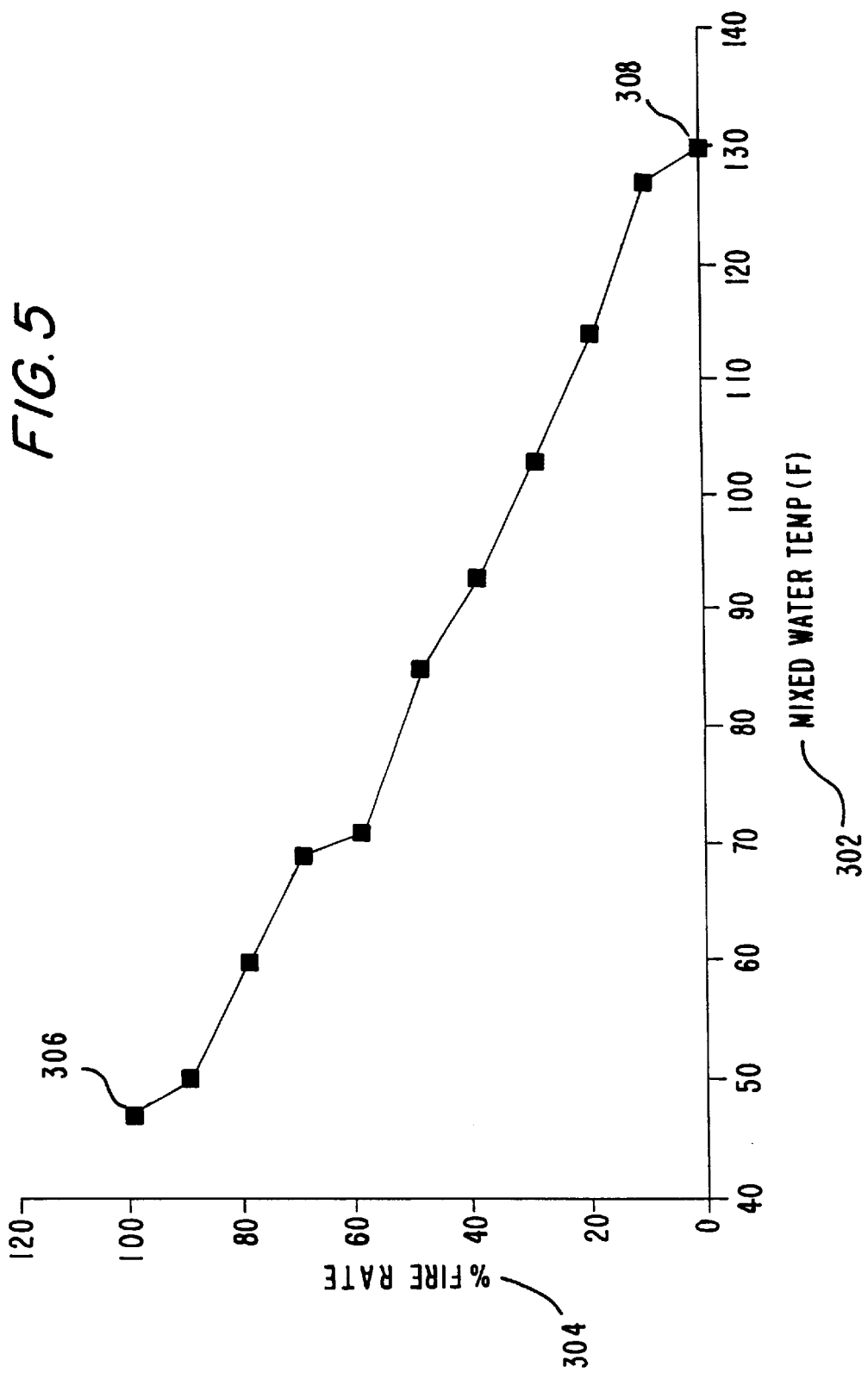
FIG. 5 is a representative graph illustrating the relationship between mixed flow temperature and percentage fire rate of the heater in accordance with the invention.

The information for an exemplary table is illustrated in graphical form in FIG. 5, and is obtained by empirical testing. The input parameter 302 is the temperature of the mixed flow, and the output parameter 304 is the fire rate. For the exemplary embodiment described above, the tabular data was obtained at a plurality of fire rates between a substantially minimum current, e.g., about 10%, and a substantially maximum current, e.g., about 100%. At each fire rate, the first tuning valve 62 and the second tuning valve 82 are adjusted to control the relative proportions of the inlet flow and the outlet flow to obtain a heated outlet flow at the setpoint temperature, and measuring the resulting mixed flow temperature at temperature sensor 26.

In order to prepare this graph, temperature measurements are made of the outlet flow and the mixed flow. A temperature measurement device, such as a Balco wire or thermocouple, is placed in the outlet flow pipe 20 to measure the outlet temperature, along with the mixed flow temperature sensor 26, described above, to measure the temperature of the mixed flow. An iterative process is followed to obtain the mixed flow temperatures at the extreme points on the graph, i.e., a first data point 306 corresponding to a substantially maximum current and a second data point 308 corresponding to a substantially minimum current. At step (1), the load controller 98 described in greater detail below, is adjusted to the maximum current, i.e., a fire rate of about 100% on the load controller 98. Consequently, the heating elements 40 begin to heat the water entering the heat exchanger tank 12 through the inlet flow pipe 16. At step (2), the flow rate and the temperature of the inlet flow are adjusted until the temperature of the outlet flow is at the setpoint temperature, which is typically 130° F. At step (3), the tuning valve 62 on the inlet flow diverting pipe 18 and the tuning valve 82 on the outlet flow diverting pipe 22 are each adjusted to satisfy a first condition, i.e., that the temperature of the mixed flow is a predetermined temperature, i.e., about 1–2° F., above the temperature of the outlet flow. At step (4), the fire rate is set to the minimum current, i.e., a fire rate of about 10%, on the load controller 98. At step (5), the flow rate and temperature of the inlet flow are adjusted so that the outlet water temperature is at the setpoint temperature. At step (6), the tuning valves 62 and 82 are adjusted again to satisfy a second condition, i.e., that the temperature of the mixed flow is a predetermined temperature, i.e., about 3–4° F., lower than the setpoint temperature.

Subsequently, steps (1) through (6) are repeated. The flow rates and inlet temperatures used in steps (2) and (5) in the first iteration are used in the second iteration. During this second iteration, the adjustment of tuning valves 62 and 82 at steps (3) and (6) is performed to arrive at a single setting for each tuning valve that satisfies both the first condition and the second condition. This process is performed in order to adjust the boundaries of the mixed flow temperature to provide a monotonic curve, wherein there is one unique value of fire rate for every value of sensed mixed flow temperature. Without such an adjustment, the mixed-flow temperature vs. fire rate curve may flatten at the boundaries, such that the process controller 96 would have difficulty in commanding a fire-rate based on a sensed temperature value. Thus the empirical relationship between the temperature of the mixed flow and the applied current is set for a particular setpoint temperature and setting of the first tuning valve 62 and the second tuning valve.

The mixed flow temperatures at 10% fire rate and 100% fire rate are recorded. After adjusting the tuning valves 62 and 82, the ratio of inlet flow and outlet flow into the mixed flow pipe 24 is fixed. To obtain the mixed flow temperature for an intermediate current, e.g., a 20% fire rate, the following steps are performed: At step (7), the fire rate is set to 20% at the load controller 98; at step (8), the flow rate and temperature of the inlet flow are adjusted such that the outlet flow temperature is at the setpoint temperature, and at step (9), the temperature of the mixed flow sensed by temperature sensor 26 is recorded. Steps (7) through (9) are repeated for each additional data point; preferably, the process is repeated for fire rates of 30% to 90% at 10% increments. The resulting relationship is plotted in a table, such as the exemplary table illustrated in FIG. 5. The data provided in FIG. 5 is loaded into the process controller 96 as a table look-up function.

A load controller 98 allocates the signal provided by the process controller 96 into three circuits. An exemplary load controller is Model BLC Series Base Load Controller manufactured by HDR Power Systems, Inc. of Columbus, Ohio. The exemplary heater 14 described above is controlled by three circuits, and each circuit is configured to handle approximately 33% of the power to the unit. It is noted that a fewer or greater number of circuits may be used, depending upon the wiring of the heater. In order to control the power provided to the heater in the exemplary embodiment, two of the circuits have a discrete on-off control by electromechanical contactors 100 and 102, and the third circuit may be selectively modulated with greater resolution by an SCR 104. The load controller 98 may be programmed to allocate the current among the three circuits. In the exemplary embodiment, the load controller 98 is programmed to allocate power according to the following protocol: For a fire rate less than about 33%, current is provided to the heating elements by the third circuit. For example, if the process controller commands 25% fire rate to the heater, the third circuit is adjusted to about 75% of the third circuit's total output. For a fire rate greater than about 33% but less than about 66%, the first circuit supplies current as controlled by the first contactor 100, and the third circuit is selectively adjusted to provide the remaining percentage commanded. For example, for a 40% fire rate, the first circuit supplies 33%, and the third circuit is adjusted to about 21% of the third circuit's total output to provide the remaining 7%. Finally, for fire rates greater than about 66%, both the first and second circuits supply current as controlled by their respective contactors 100 and 102, and the third circuit is adjusted to meet the remaining percentage. For example, for an 80% fire rate, the first and second circuits supply the first 66%, and the third circuit is selectively adjusted to approximately 42% of the third circuit's power to provide the remaining 14%. It is noted that this power allocation is exemplary, and alternative arrangements may be provided as is known in the art. For example, a single, larger SCR could be provided to modulate power to the three circuits, thereby eliminating the two contactors. In this case, the load controller 98 would be programmed to control the SCR for the full range of fire rates. Alternatively, several smaller SCR's could be provided. For an exemplary embodiment having three circuits, it is noted that a single SCR could provided for each circuit. As yet another alternative, a plurality of contactors may be utilized to provide incremental control, with increased control provided by increasing the number of contactors.

One skilled in the art will appreciate that the present invention can be practiced by other than the described embodiments, which are presented here for purposes of illustration and not of limitation. All such other embodiments, therefore, are intended to be included within the spirit and scope of the appended claims.

We claim:

1. A heating system for supplying a liquid at a predetermined setpoint temperature, comprising:

a heat exchanger tank having an inlet for receiving an inlet flow of liquid into the tank, an outlet for allowing an outlet flow of liquid to leave the tank;

a heater positioned in the heat exchanger tank and configured to heat the liquid passing through the heat exchanger tank from the inlet to the outlet;

an inlet flow diverting pipe carrying a portion of the inlet flow diverted from flowing into the heat exchanger tank;

an outlet flow diverting pipe carrying a portion of the outlet flow diverted from the outlet;

a mixed flow pipe configured to carry a mixed flow of liquid partially received from the inlet flow diverting pipe and partially received from the outlet flow diverting pipe;

a first tuning valve on the inlet flow diverting pipe to control flow in the inlet diverting pipe and a second tuning valve on the outlet flow diverting pipe to control flow in the outlet diverting pipe, wherein the tuning of the first tuning valve and the second tuning valve provides a fixed ratio of inlet flow and outlet flow into the mixed flow pipe;

a temperature sensor configured to determine the temperature of the mixed flow in the mixed flow pipe; and a temperature control system configured to modulate the current to the heater in response to the temperature of the mixed flow in the mixed flow pipe based on a monotonic, empirical relationship between the temperature of the mixed flow in the mixed flow pipe and the current applied to the heater determined by the setpoint temperature and the tuning of the first tuning valve and the second tuning valve.

2. The heating system defined in claim 1, wherein the monotonic, empirical relationship between the temperature of the mixed flow in the mixed flow pipe and the current applied to the heater has a first data point defined by the condition wherein the first and second tuning valves are tuned such that the temperature of the mixed flow in the mixed flow pipe is a predetermined temperature above the temperature of the inlet flow when the heater is at a substantially maximum current and a second data point defined by the condition wherein the first and second tuning valves are tuned such that the temperature of the mixed flow is a predetermined temperature below the setpoint temperature when the heater is at a substantially minimum current.

3. The heating system of claim 1, wherein the temperature control system further comprises a process controller configured to provide a heater control signal based on the temperature of the mixed flow in the mixed flow pipe.

4. The heating system of claim 3, wherein the temperature control system further comprises a silicon-controlled rectifier configured to selectively apply current to the heater in response to the heater control signal from the process controller.

5. The heating system of claim 3, wherein the temperature control system further comprises an electro-mechanical contactor configured to selectively apply current the heater in response to the heater control signal from the process controller.

6. The heating system of claim 1, which further comprises an inlet pipe configured to supply the inlet flow of liquid into the heat exchanger tank and an orifice disk positioned within the inlet pipe to divert a portion of the inlet flow to the inlet flow diverting pipe.

7. The heating system of claim 6, which further comprises an outlet pipe configured to receive the outlet flow from the heat exchanger tank and a second disk positioned within the outlet pipe to divert a portion of the outlet flow to the outlet flow diverting pipe.

8. A heating system for supplying a liquid at a predetermined setpoint temperature, comprising:
 a heat exchanger tank having an inlet for receiving an inlet flow of liquid into the tank, an outlet for allowing an outlet flow of liquid to leave the tank;
 a heater positioned in the heat exchanger tank and configured to heat the liquid passing through the heat exchanger tank from the inlet to the outlet;
 an inlet flow diverting pipe carrying a portion of the inlet flow diverted from flowing into the heat exchanger tank;
 a first tuning valve on the inlet flow diverting pipe to control flow in the inlet diverting pipe;
 an outlet flow diverting pipe carrying a portion of the outlet flow diverted from the outlet;
 a second tuning valve on the outlet flow diverting pipe to control flow in the outlet diverting pipe;
 a mixed flow pipe configured to carry a mixed flow of liquid partially received from the inlet flow diverting pipe and partially received from the outlet flow diverting pipe;
 a temperature sensor configured to determine the temperature of the mixed flow in the mixed flow pipe; and
 a temperature control system configured to modulate the current to the heater in response to the temperature of the mixed flow in the mixed flow pipe based on a monotonic, empirical relationship between the temperature of the mixed flow in the mixed flow pipe and the current applied to the heater, the monotonic, empirical relationship having a first data point defined by the condition wherein the first and second tuning valves are tuned such that the temperature of the mixed flow in the mixed flow pipe is a predetermined temperature above the temperature of the inlet flow when the heater is at a substantially maximum current and a second data point defined by the condition wherein the first and second tuning valves are tuned such that the temperature of the mixed flow is a predetermined temperature below the setpoint temperature when the heater is at a substantially minimum current.

9. The heating system of claim 8, wherein the temperature control system further comprises a process controller configured to provide a heater control signal based on the temperature of the mixed flow in the mixed flow pipe.

10. The heating system of claim 9, wherein the temperature control system further comprises a silicon-controlled rectifier configured to selectively apply current to the heater in response to the heater control signal from the process controller.

11. The heating system of claim 9, wherein the temperature control system further comprises an electro-mechanical contactor configured to selectively apply current the heater in response to the heater control signal from the process controller.

12. The heating system of claim 8, which further comprises an inlet pipe configured to supply the inlet flow of liquid into the heat exchanger tank and an orifice disk positioned within the inlet pipe to divert a portion of the inlet flow to the inlet flow diverting pipe.

13. The heating system of claim 12, which further comprises an outlet pipe configured to receive the outlet flow from the heat exchanger tank and a second disk positioned within the outlet pipe to divert a portion of the outlet flow to the outlet flow diverting pipe.

14. A heating system for supplying a liquid at a predetermined setpoint temperature, comprising:
 a heat exchanger tank having an inlet for receiving an inlet flow of liquid into the tank, an outlet for allowing an outlet flow of liquid to leave the tank;
 a heater positioned in the heat exchanger tank and configured to heat the liquid passing through the heat exchanger tank from the inlet to the outlet;
 an inlet flow diverting pipe carrying a portion of the inlet flow diverted from flowing into the heat exchanger tank;
 an outlet flow diverting pipe carrying a portion of the outlet flow diverted from the outlet;
 a mixed flow pipe configured to carry a mixed flow of liquid partially received from the inlet flow diverting pipe and partially received from the outlet flow diverting pipe;
 a temperature sensor configured to determine the temperature of the mixed flow in the mixed flow pipe;
 a first tuning valve on the inlet flow diverting pipe to control flow in the inlet flow diverting pipe and a second tuning valve on the outlet flow diverting pipe to control flow in the outlet diverting pipe, wherein the first tuning valve and the second tuning valve are tuned such that the temperature of the mixed flow in the mixed flow pipe is a predetermined temperature above the temperature of the inlet flow when the heater is at a substantially maximum current and the temperature of the mixed flow is a predetermined temperature below the setpoint temperature when the heater is at a substantially minimum current; and a temperature control system configured to modulate the current to the heater in response to the temperature of the mixed flow in the mixed flow pipe based on a monotonic, empirical relationship between the temperature of the mixed flow in the mixed flow pipe and the current applied to the heater as determined by the setpoint temperature and the tuning of the first tuning valve and the second tuning valve.

15. The heating system of claim 14, wherein the temperature control system further comprises a process controller configured to provide a heater control signal based on the temperature of the mixed flow in the mixed flow pipe.

16. The heating system of claim 15, wherein the temperature control system further comprises a silicon-controlled rectifier configured to selectively apply current to the heater in response to the heater control signal from the process controller.

17. The heating system of claim 15, wherein the temperature control system further comprises an electro-mechanical contactor configured to selectively apply current the heater in response to the heater control signal from the process controller.

* * * * *

UNITED STATES PATENT AND TRADEMARK OFFICE
CERTIFICATE OF CORRECTION

PATENT NO. : 6,445,880 B1
DATED : September 3, 2002
INVENTOR(S) : Hollander et al.

It is certified that error appears in the above-identified patent and that said Letters Patent is hereby corrected as shown below:

Column 5,
Line 49, "Q." should read -- Q, --
Equation (2), "Q=$f$(m, $\Delta$T)" should read -- Q=$f$($\dot{m}$, $\Delta$T) --

Column 6,
Equation (1), "(1)" should read -- (3) --

Column 9,
Line 33, "current the" should read -- current to the --

Column 10,
Line 31, "current the" should read -- current to the --.

Signed and Sealed this

Twenty-eighth Day of October, 2003

JAMES E. ROGAN
*Director of the United States Patent and Trademark Office*